United States Patent
Aiyagari et al.

(10) Patent No.: US 7,702,693 B1
(45) Date of Patent: Apr. 20, 2010

(54) ROLE-BASED ACCESS CONTROL ENFORCED BY FILESYSTEM OF AN OPERATING SYSTEM

(75) Inventors: Sanjay Aiyagari, San Jose, CA (US); Andrew G. Harvey, Pleasanton, CA (US); Hsuan-Chung Lee, Campbell, CA (US); Gregory Verissimo, Pleasanton, CA (US)

(73) Assignee: Cisco Technology, Inc., San Jose, CA (US)

( * ) Notice: Subject to any disclaimer, the term of this patent is extended or adjusted under 35 U.S.C. 154(b) by 415 days.

(21) Appl. No.: 10/698,498

(22) Filed: Oct. 30, 2003

(51) Int. Cl.
*G04F 17/00* (2006.01)

(52) U.S. Cl. ........................ 707/785; 707/784; 707/783; 707/781

(58) Field of Classification Search ............... 707/3, 707/9, 10, 103
See application file for complete search history.

(56) References Cited

U.S. PATENT DOCUMENTS

| | | | |
|---|---|---|---|
| 5,911,143 A * | 6/1999 | Deinhart et al. | 707/103 R |
| 6,202,066 B1 * | 3/2001 | Barkley et al. | 707/9 |
| 6,233,576 B1 * | 5/2001 | Lewis | 707/9 |
| 6,279,111 B1 * | 8/2001 | Jensenworth et al. | 726/10 |
| 6,748,436 B1 | 6/2004 | Anand et al. | |
| 6,950,822 B1 * | 9/2005 | Idicula et al. | 707/10 |

OTHER PUBLICATIONS

Ferraiolo, D. et al., "Proposed NIST Standard for Role-Based Access Control" 2001 ACM (51 pages).

* cited by examiner

*Primary Examiner*—Tony Mahmoudi
*Assistant Examiner*—Paul Kim
(74) *Attorney, Agent, or Firm*—Hickman, Palermo, Truong & Becker LLP

(57) ABSTRACT

A method and system for role-based access control enforced by an Operating System filesystem are provided. A file representing a resource is created and stored in the Operating System filesystem. A user requests access to the resource and provides user-identifying information and a resource identifier. An access identifier is created based on the user-identifying information and the resource identifier, and is formatted as the file attribute used by the Operating System to manage file access. A system call to the Operating System is made to perform an operation on the file representing the resource, where the system call uses the access identifier to gain access to the file. The user is granted access to the resource only if the operating system successfully performs the operation on the file representing the resource.

24 Claims, 8 Drawing Sheets

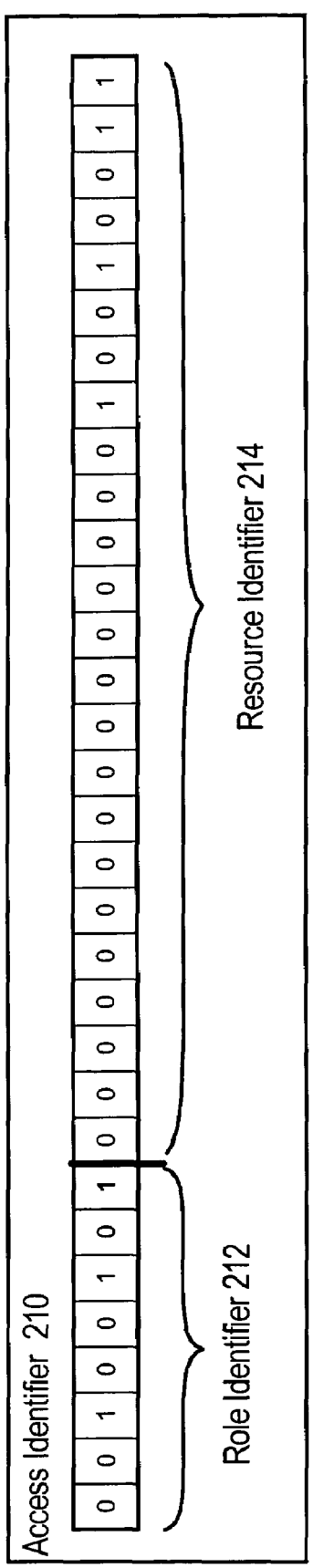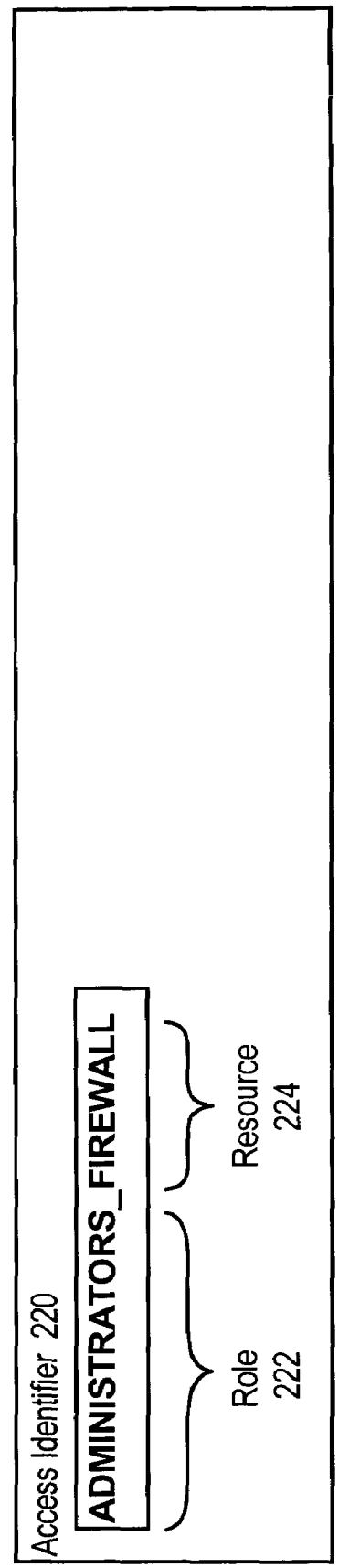

| inode 310 | |
|---|---|
| File Type / Access Permissions | 0000 0000 0000 0000 0000 1001 1111 1111 |
| Link Count | 0000 0000 0000 0000 0000 0000 0000 0101 |
| UserID | ... ... ... ... |
| GroupID | 0010 0101 0000 0000 0000 0000 1001 0011 |
| File Size | ... ... ... ... |
| Data Block Addresses | |
| ... | ... ... ... ... |
| ... | |
| Time Last Accessed | ... ... ... ... |
| Time Last Modified | ... ... ... ... |
| Time Created | |

Permission Bits 312 → (row 1)
Access Identifier 210 → (row 4)

FIG. 3A

ROLE-BASED ACCESS CONTROL ENFORCED BY FILESYSTEM OF AN OPERATING SYSTEM

FIELD OF THE INVENTION

The present invention generally relates to management of computer and network resources, and relates more specifically to role-based access control mechanisms for controlling access to network resources.

BACKGROUND OF THE INVENTION

Role-Based Access Control (RBAC) mechanisms enable software applications and network resources to limit or control access based on the business or operational role of a user or a group of users. Numerous RBAC mechanisms have been developed in the past for various purposes and contexts, but have had numerous disadvantages.

Typically, the RBAC mechanisms are implemented as a centralized server with a secure repository, requiring a client software element that must be installed on every user machine. In such implementations the RBAC mechanisms include complex security mechanisms and require application software developers to learn a specific API and to write code against it. While RBAC has great utility in many contexts, these disadvantages have reduced the ubiquity of RBAC mechanisms and have imposed high development costs on applications and systems that need to use RBAC.

In terms of simplicity, one of the most well-known and easy to write code against subsystems in a computer system is the filesystem. A typical filesystem usually manages files which are organized in a number of directories. The filesystem may manage a wide variety of file types with respect to file formats and file purposes. For example, files may be stored in the file system in text, binary, or any software-specific format. Also, with respect to their functions, files may be classified as boot files, system files, application specific files, device files, special files, or data files. However, all the files in a filesystem, regardless of their type or purpose, are managed by the Operating System (OS) by using well-defined, easy to use, simple, and thoroughly tested file-management facilities.

The OS filesystem facilities include various APIs and system calls to control access to and perform operations on the files. These facilities are well-known and application software developers routinely use them. Depending on the OS, the filesystem facilities may consist of a library of system calls, or of a number of well-defined APIs. The system calls and the APIs include various routines for performing operations on the files. Such operations typically include opening a file, closing a file, reading from a file, searching through a file, writing to the file, appending to the file, and deleting the file. Any of these file operations, however, is performed only if the user requesting the operation is allowed access to the file by the OS.

For this reason, the OS filesystem system calls and APIs also include various routines for managing file security and file access. These routines depend on the user and group authentication and authorization mechanism of the particular OS to control the access of the users and groups to files in the filesystem. Different operating systems use different user and group authentication and authorization mechanisms, but typically a user is associated with a username and a password, and a user may also belong to one or more groups of users.

The different operating systems employ different schemes to control access of users and groups to the files in the filesystem. Without exception, however, all operating systems provide a set of file attributes which are used by the filesystem routines to manage and control access to the files. Examples of such attributes include an owner user identifier (UserID) that identifies the owner of the file, a group identifier (GroupID) that identifies a group of users, and an Access Control List (ACL) which includes the identifiers of a number of users or groups. In addition to identifiers identifying users, file attributes called permissions are also used to indicate what, if any, file operations are allowed on the file and which user or group is allowed to perform which file operation.

The operating systems usually handle with ease the associating of users and groups with functional or operational roles. As described above, the OS filesystem calls and APIs for controlling user or group access to files are also well-known and easy to use. However, the existing RBAC mechanisms cannot manage a wide variety of computer resources in a low-cost, low-impact, and client-software efficient manner, and invariably suffer from a number of disadvantages, some of which where mentioned above.

Based on the foregoing, there is clearly a need for an RBAC system that requires minimal client software and otherwise has a greatly reduced infrastructure. There is also a need for an RBAC system that still provides security, that can run in a localized manner on a single machine, and that requires applications only to use existing APIs.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY OF THE INVENTION

A method and system for role-based access control enforced by an Operating System filesystem are provided. A file representing a resource is created and stored in the Operating System filesystem. An access value, corresponding to a combination of a user role and the resource, is assigned to a file attribute of the file where the file attribute is used by the Operating System to manage file access. A user requests access to the resource and provides user-identifying information and a resource identifier. An access identifier is created based on the user-identifying information and the resource identifier, and is formatted as the file attribute used by the Operating System to manage file access. A system call to the Operating System is made to perform an operation on the file representing the resource, where the system call uses the access identifier to gain access to the file. The user is granted access to the resource only if the operating system successfully performs the operation on the file representing the resource.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2A is a diagram showing an example of an access identifier;

FIG. 2B is a diagram showing another example of an access identifier;

FIG. 3A is a diagram illustrating the interrelation between the access identifier of FIG. 2A and a group identifier file attribute;

DETAILED DESCRIPTION OF THE INVENTION

A method and system for role-based access control enforced by an OS filesystem is described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

System Overview

Figure 1:
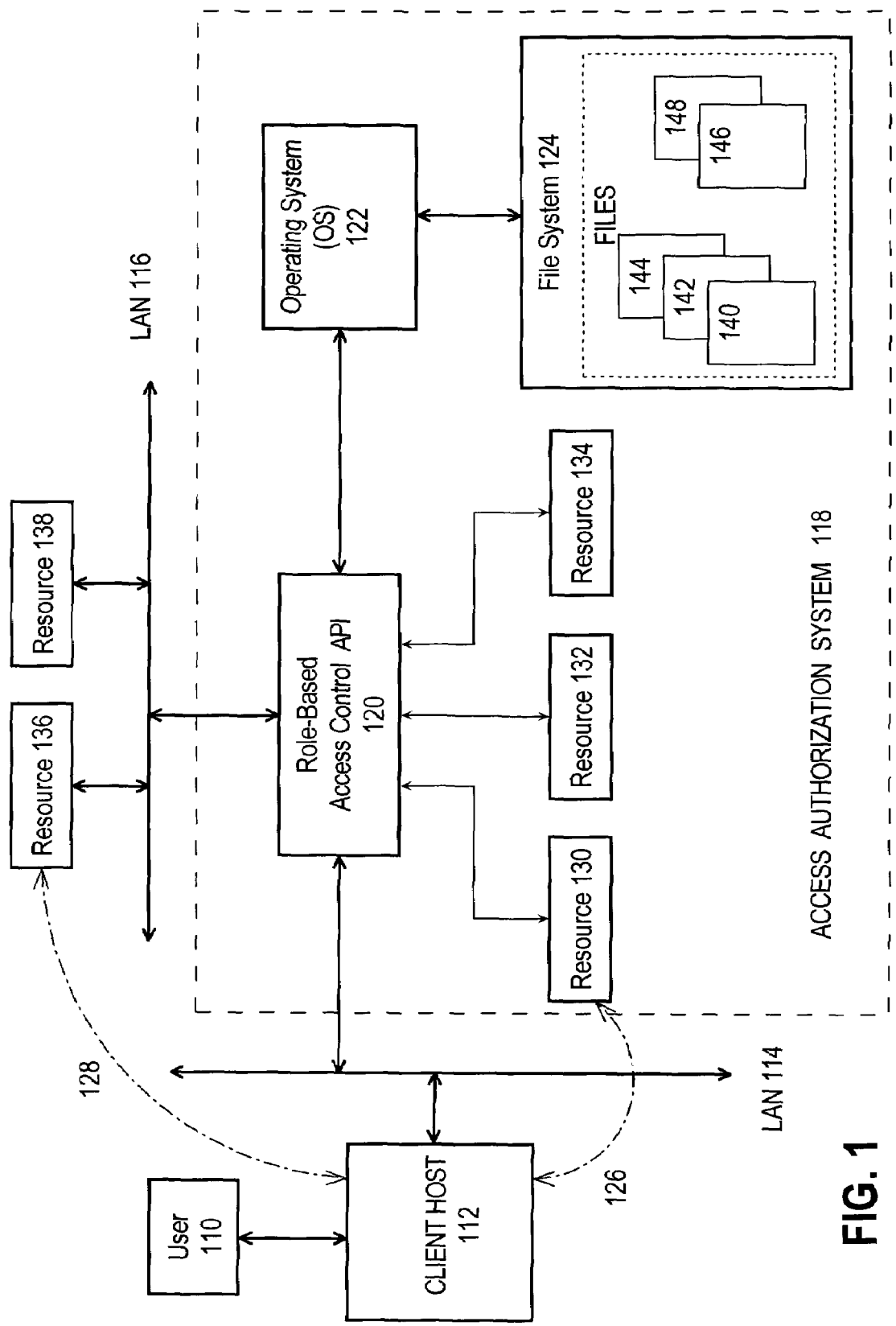
FIG. 1 is a block diagram that illustrates a system for access authorization.

FIG. 1 is a block diagram that illustrates an access authorization system. A user 110 requests, from the access authorization system 118, access to a network resource, or to a resource local to the access authorization system 118. In one embodiment, the user 110 is a single user of the client host 112. In a different embodiment, the user 110 may represent a group of users defined under the security mechanisms of the particular OS.

The client host 112 represents a computer system used by the user 110, and is capable of accessing a resource in response to a request for access from the user 110. The client host 112 may be connected to a Local Area Network (LAN) 114. In one embodiment, the access authorization system 118 is communicatively connected to the client host 112 through the LAN 114, and is further communicatively connected to the network resources 136 and 138 through a different LAN 116. In a different embodiment, the access authorization system 118 may be communicatively connected to the client host 112 and the network resources 136 and 138 through the same LAN. In yet a different embodiment, the access authorization system 118 may also act as the client host used by the user 110.

The access authorization system 118 includes an RBAC API 120 and an OS 122, which operatively controls a filesystem 124. In one embodiment, the access authorization system 118 includes the RBAC API 120, the OS 122, and the filesystem 124 in a single computer system. In different embodiments, the access authorization system 118 may be distributed among several computer systems with each computer system including one or more of the RBAC API 120, the OS 122, and the filesystem 124.

The RBAC API 120 controls or limits access to the local resources 130, 132, and 134, and to the network resources 136 and 138 based on user role, such as business or operational role. In one embodiment, the RBAC API 120 may be implemented as a library of software routines (or functions). In other embodiments, the RBAC API 120 may be implemented as a software module, a stand-alone computer application, or as a service running on a server computer system. Depending on the types and number of resources to which access is to be controlled or limited, the methods disclosed herein may be practiced in a wide variety of software or hardware implementations.

In one embodiment, the local resources 130, 132, and 134 may represent software applications or software application messages, and the network resources 136 and 138 may represent different hardware devices connected to the network. In a different embodiment, the local resources 130, 132, and 134 may represent special device files or directories in the local file system, and the network resources 136 and 138 may represent different network services. Any type or number of resources can be supported through various embodiments. Access to any computer-driven hardware device, software device, software application, or any computer system resource may be controlled by the methods disclosed herein. Examples include but are not limited to, any network infrastructure devices or end station devices, device groups, firewalls, VPN templates, or event bus subjects.

Each resource which the access authorization system 118 controls or limits access to is represented by a special-purpose file located in the filesystem 124. The filesystem 124 may be local to the access authorization system 118, or it may be a network file system. In FIG. 1, the files 140, 142, 144, 146 and 148 represent the resources 130, 132, 134, 136 and 138 respectively. Thus, files 140-148 may represent servers, printers, routers, switches, files, directories, etc. The files 140, 142, 144, 146, 148 are not actual resources, but rather represent resources for purposes of controlling access to the represented resources. One resource may be represented by a number of files, and a number of resources may be represented by a single file. In one embodiment, the files representing the resources may be regular files. In different embodiments, the files representing the resources may be special files, device files, or symbolic links to files located anywhere in the filesystem 124. Furthermore, the files representing the resources may be organized in the filesystem 124 under one or more directories.

Regardless of its file type or location, a file representing a resource has file attributes associated with it, which file attributes are used by the OS 122 to manage access to the file in response to calls or requests from RBAC API 120. Examples of such file attributes include but are not limited to, user identifiers (UserIDs), group identifiers (GroupIDs), and Access Control Lists (ACLs). Different file attributes may be used by different operating systems to control access to the files in the filesystem 124.

Although different operating systems may use different mechanisms to control access to files, invariably all operating systems provide well-developed and tested libraries and modules for file access and file manipulation. Thus, the methods disclosed herein are not specific to any particular type or brand of commercial or proprietary OS, and may be implemented on any OS that provides mechanisms for file access and manipulation.

In operation, the user 110 requests access to the local resource 130 through the client host 112. As part of the user request, the RBAC API 120 receives the user-identifying information and the resource identifier for resource 130. Based on this information, RBAC API 120 determines the role associated with user. Using the credentials associated with the role, the RBAC API 120 then calls the OS 122 to perform an operation on the file 140 associated with the local resource 130. In one embodiment, the operation is opening the file. In this embodiment, the RBAC API 120 calls a standard file-opening routine from the OS 122 to open the file 140 with the specified role credentials. If the call to open the file 140 succeeds, then the RBAC API 120 will allow the user 110 access to the local resource 130 represented by file 140, as indicated by the arrow 126. The same role-based access control method may be used by the RBAC API 120 to allow the user 110 access to the network resource 136 as indicated by the arrow 128.

Method Overview

Figure 4:
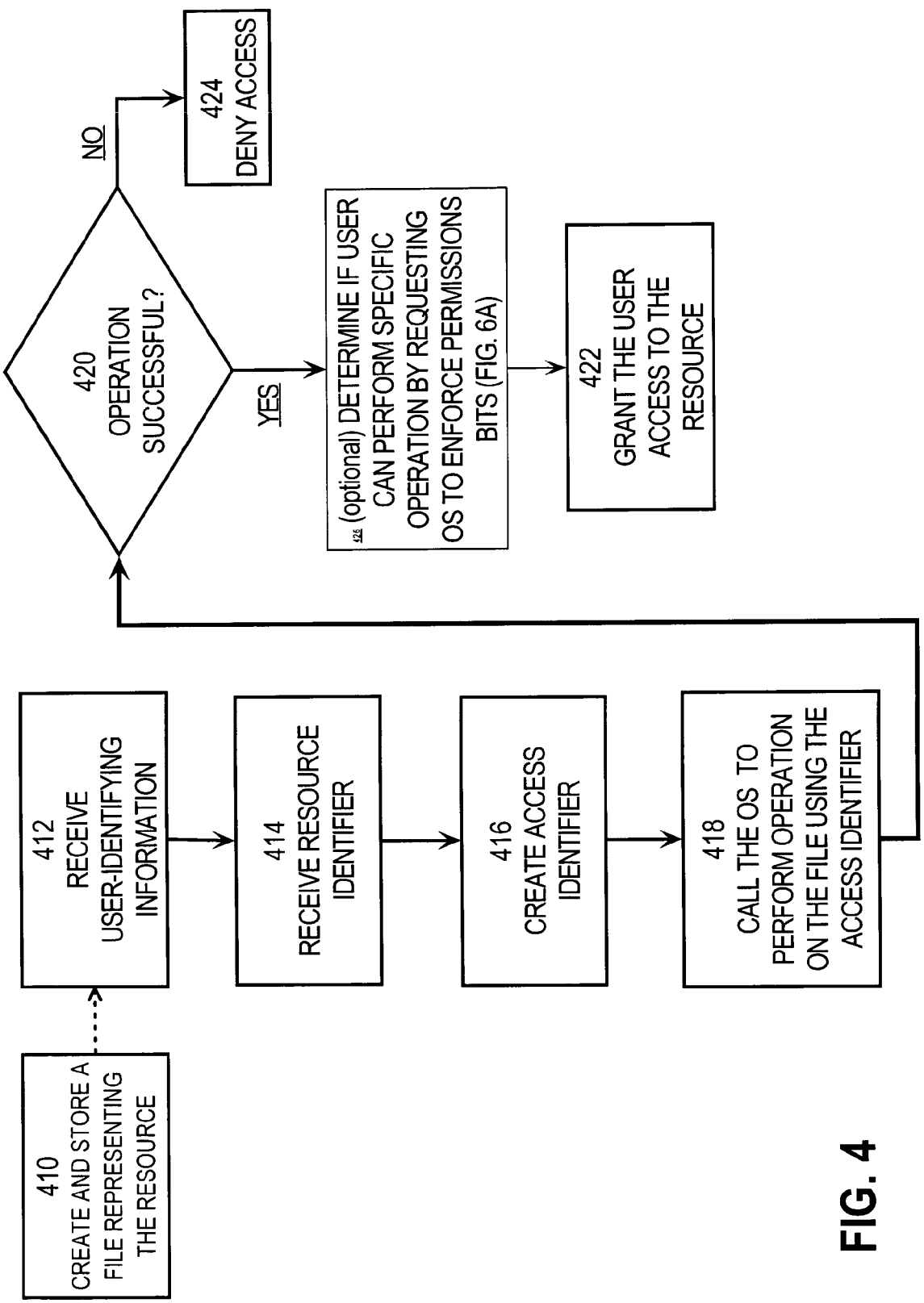
FIG. 4 is a flow diagram of a method for role-based access control.

FIG. 4 is a flow diagram of a method for role-based access control. At step 410 a file that represents the resource is created and stored in the OS filesystem. In one embodiment, the file is a regular file, and its group identifier file attribute is assigned a value that corresponds to the combination of a user role and a resource.

At step 412 user-identifying information is received. In one embodiment, the user-identifying information is a UserID and a GroupID, and a user role is determined from the UserID and the GroupID. In a different embodiment, the UserID is determined from a username and a password, and the GroupID is determined by finding, from the OS, using an appropriate OS call, a group that includes the user.

At step 414 the resource identifier associated with the resource is received. In one embodiment, the resource identifier is a numeric value, and is determined based on the identity of the resource.

At step 416 an access identifier is created based on the user-identifying information and the resource identifier. In one embodiment, the access identifier is formatted to match the format of a group identifier file attribute which is conventionally used by the OS to manage access to files.

At step 418 the OS is called to perform an operation on the file representing the resource. The OS uses the access identifier to attempt to gain access to the file. In one embodiment, the OS forks a new OS process, changes the effective GroupID of the process to the access identifier, and then attempts to open the file representing the resource. At step 420 a result of the operation performed is evaluated. Step 420 may involve evaluating a return code.

If step 420 has a true result, then in step 426 the method optionally determines if the user can perform a specific operation with the network resource by requesting the operating system to enforce permissions bits of the file representing the resource. Alternatively, step 420 may involve enforcing thread permissions or process permissions. In effect, the operating system is used as a fine-grained access enforcement point. Details of an embodiment of step 420 are described below with in connection with FIG. 6A, FIG. 6B.

Success of the operation at step 420 means that the user has the right credentials to open the file representing the resource, and therefore at step 422 the user is granted access to the resource. Failure of the operation at step 420 usually means that the user does not have the proper credentials to open the file, and therefore at step 424 the user is denied access to the resource.

The File Representing the Resource

A file representing a resource, such as files 140-148, may be of different types including but not limited to, a regular file, a special file, a device file, or a symbolic link. The files representing the resources may be organized in one or more directories. Each resource may be represented by one or more files, and many resources may be represented by a single file. Each file representing a resource is associated with at least one file attribute used by the operating system to manage file access. In one embodiment, in a filesystem controlled by a UNIX-type OS, such file attribute is the GroupID stored in the file's inode. In a different embodiment, the file attribute is an Access Control List (ACL) which includes the identifiers of all users and groups allowed access to the file associated with the ACL.

A file representing a resource is created in the filesystem using the conventional capabilities of the OS. The file representing the resource has an access value assigned to one of its file attributes that are used by the OS to manage file access. The access value is determined by the combination of a role and a resource, and may be unique depending on the file attribute to which it is to be assigned. In one embodiment, the access value is a numeric value. In different embodiments, the access value may be an alphanumeric security identifier of a particular format, a username, or a group name.

In one embodiment, the file attribute is the group identifier (GroupID) file attribute. In this embodiment, a user that creates a file representing a resource belongs to a group with a GroupID that is equal to the access value corresponding to a combination of a role and a resource. Thus, upon creation the file assumes this access value as its GroupID. Subsequently, to enforce access control, this access value, stored as the GroupID, is matched against the GroupID of any OS process that attempts to open the file.

In a different embodiment, an access value may be assigned to a file attribute associated with a file representing the resource after the file is created. In particular, where the file attribute is an ACL, OS functions or system calls may be used to add an access value to the ACL of the file representing the resource. In this embodiment, the access value may represent the group name of a group which identifies a user role that is allowed access to the resource represented by the file.

User and Resource Identifying Information

A user requesting access to a resource provides user-identifying information and information identifying the resource as part of the request. The user-identifying information is used to determine a role associated with a user. The user identifying information may include a user name and a password. In one embodiment, the user name and the password are associated with a unique user identifier (UserID). In this embodiment, a group identifier (GroupID) associated with a group that includes the user is determined from the OS based on the user identifier. In a different embodiment, a user may provide a user name and a password associated with a unique user identifier, and may also explicitly provide a group identifier indicating a group to which the user belongs.

Based on the user identifier and the group identifier, a role associated with the user is determined. In some embodiments, a role identifier may be uniquely associated with a role. Usually, the role of the user is based on some business or operational functions that the user performs. For example, roles may include but are not limited to system administrators, regional administrators, firewall administrators, device operators, sales managers, and regional managers.

As part of an access request, the user also provides information identifying the resource to which access is sought. The information may include a resource identifier associated with the resource. In one embodiment the resource identifier may be a numeric value such as a device identifier or IP address. In a different embodiment the resource identifier may be an alphanumeric string, such as a device name or server application name. Resources may be local to the computer system or may be network resources. Examples of resources that may be identified in this way include but are not limited to, hardware devices, software devices, device groups, VPN templates, and event bus messages. The resource identifier identifying a particular resource is used in combination with the user-identifying information to construct an access identifier that is used to access the file associated with the resource.

The Access Identifier

The access identifier is created from the user-identifying information and the resource identifier using a format compatible with a format of an access value, which is assigned to a file attribute of a file representing a resource. In some embodiments the access identifier and the access value are the same numeric value or alphanumeric string, but it is not necessary for the access identifier to match the access value assigned to the file attribute of the file representing the resource. Furthermore, in some embodiments the access identifier is constructed on the fly, and in other embodiments the access identifier may be a bit-mask in which bits that are set indicate the roles allowed access to the resource.

The access identifier may be formatted as a file attribute that is used by the OS to manage file access. In one embodiment the access identifier may conform to the format of a group identifier file attribute. In another embodiment the access identifier may be formatted as an Access Control Entry (ACE) of an ACL file attribute. The ACE may be represented as a numeric value or an alphanumeric string.

When the user role and the resource identifier are represented by numeric values the access identifier may also be represented by a numeric value. In one embodiment individual bits of the access identifier are divided in two sets, with one set storing the user role (or the role identifier) associated with the role, and the other set storing the resource identifier.

In a different embodiment, the access identifier is a numeric value represented by a plurality of bits. A first set of bits represents a bitmap, with each bit of the bitmap uniquely associated with a role of the user, and a second set of bits stores the numeric value of the resource identifier. Each bit of the bitmap that is turned "on" indicates that the role associated with the bit is allowed access to the resource. In yet a different embodiment, the second set of bits for storing the resource identifier may also be a bitmap, with each of the bits of this second bitmap uniquely associated with a resource.

FIG. 2A is a diagram showing an example of an access identifier. The access identifier 210 is a 32-bit numeric value. The first eight bits store the role identifier 212, and the last twenty-four bits store the resource identifier 214. It is not necessary, however, that eight bits are allocated to store the role identifier 212 and twenty-four bits are allocated to store the resource identifier 214. Any number of bits in any order can store the role identifier 212, and any number of bits in any order can store the resource identifier 214. Furthermore, the total number of bits used to store the role and resource identifiers may be less than the total number of bits available in the access identifier 210.

In one embodiment, the access identifier 210 shown in FIG. 2A may represent $2^8$ roles and $2^{24}$ resources. In this embodiment, the access identifier 210 indicates that the role with role identifier 212 equal to binary "0010 0101" is allowed access to the resource with resource identifier 214 equal to binary "0000 0000 0000 0000 1001 0011". In a different embodiment, the role identifier 212 represents a bitmap with each bit uniquely associated with a role. In this embodiment, the access identifier 210 will indicate that roles with role identifier 212 equal to any of the binary "0010 0000", "0000 0100", and "0000 0001" is allowed access to the resource with resource identifier 214 equal to binary "0000 0000 0000 0000 1001 0011".

FIG. 2B is a diagram illustrating another example of an access identifier. The access identifier 220 is an alphanumeric value. The role 222 is "ADMINISTRATORS", and the resource 224 is "FIREWALL". It is not necessary, however, that the role is placed in the access identifier before the resource, and there are no particular limitations to the length of the alphanumeric value. In one embodiment, the access identifier "ADMINISTRATORS_FIREWALL" may be a user or a group name, and in this embodiment the length and the type of characters allowed in the access identifier 220 is governed by the rules imposed by the OS on the user and group names.

Figure 3B:
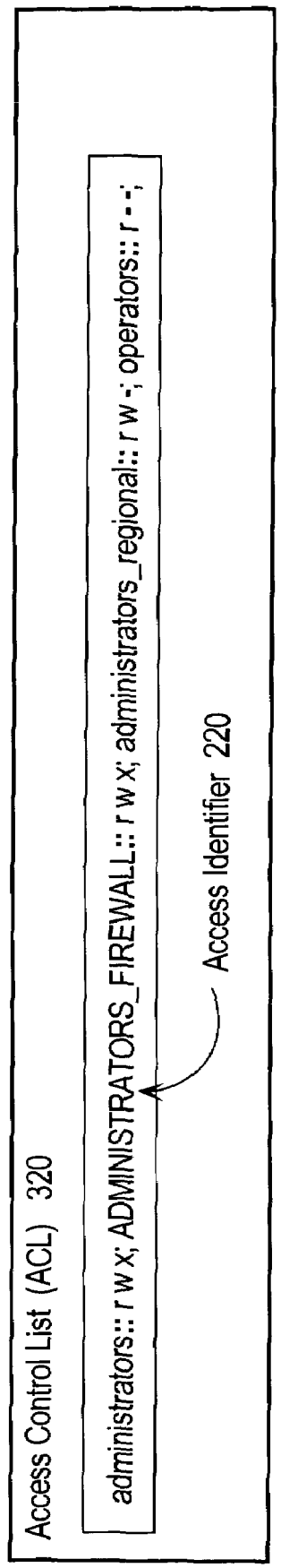
FIG. 3B is a diagram further illustrating the interrelation between the access identifier of FIG. 2B and an Access Control List file attribute.

FIG. 3A and FIG. 3B are diagrams illustrating the interrelation between the access identifier and the access value assigned to a file attribute of a file associated with a resource.

Referring first to FIG. 3A, an inode 310 includes some of the file attributes of a file in the filesystem that represents a resource. The inode 310 includes a group identifier (GroupID) file attribute represented by a 32-bit numeric value. The GroupID file attribute holds the binary value "0010 0101 0000 0000 0000 0000 1001 0011" which is an access value assigned to it when the file representing the resource (and respectively its inode 310) was created. The access identifier 210 is formatted as a GroupID file attribute and, as shown in FIG. 3A, it holds the same binary value of "0010 0101 0000 0000 0000 0000 1001 0011", where the first eight bits hold the role identifier and the last twenty-four bits hold the resource identifier. Thus, in this embodiment, an OS process, having an access identifier 210 with a value of "0010 0101 0000 0000 0000 0000 1001 0011" assigned to its process GroupID attribute, is allowed to access the file with inode 310 because the process GroupID attribute will match the GroupID file attribute.

Referring now to FIG. 3B, an ACL 320, associated with a file representing a resource, includes the user and group identifiers of all users and groups allowed to access the file. The ACL 320 includes an entry representing an access value of "ADMINISTRATORS_FIREWALL" which was included in the ACL 320 when, or after, the file was created. ACL 320 allows "ADMINISTRATORS_FIREWALL" Read (indicated by "r"), Write (indicated by "w"), and eXecute (indicated by "x") access to the file. The access identifier 220 is formatted as the ACL entry. Thus, any OS process that uses the credentials of the access identifier 220 to perform an operation on the file can compare the access identifier 220 to the entries in the ACL looking for a match indicating that the operation on the file is allowed.

Mode 310 is one example of an operating system descriptor structure that may be used in one embodiment. With other operating systems, other descriptor structures may be used.

In certain embodiments, such descriptor structures further include time fields that indicate a last time when a file has been accessed, modified, created, etc. For example, in FIG. 3A the inode 310 comprises a Time Last Accessed field 314, Time Last Modified field 316, and Time Created field 318. The values of the time fields may be used to perform time-based access control policies. For example, if block 422 of FIG. 4 yields a true result, then the process may additionally test whether the then-current time is greater than any of the time fields 314, 316, 318 by more than a specified threshold. If so, then use of the associated network resource is refused.

For example, consider an online voting system in which an individual is not allowed to vote more than once in a 24-hour period. In such a system, the date field of the user permission file will be checked to see if the file has been accessed within the past 24 hours. If the file has been accessed in the past 24 hours, then that user is not allowed to vote.

Performing the File Operation

A file operation on the file representing the resource is performed by the native file-access and file-manipulation facilities of the OS. The OS uses the access identifier to gain access to the file representing the resource. Any routine or system call of the file-manipulation facilities of the OS may be used as the operation. If the access identifier includes proper credentials to access the file representing the resource, the OS successfully performs the operation on the file. The RBAC API then grants the user access to the resource.

Because all security checks and role checks are performed by the native OS routines and system calls, the disclosed approaches and do not require a large client-server computer system. Applications may interact with a simple RBAC API, which uses conventional OS routines and system calls to implement RBAC controls.

In one embodiment, an access value, corresponding to a unique combination of a role and a resource and formatted as a group identifier (GroupID) file attribute, is assigned to the GroupID file attribute of the file representing the resource. An access identifier is created when the user requests access to the resource. The access identifier is formatted as a GroupID file attribute and is constructed on the basis of the role identifier and the resource identifier. The access identifier is then assigned to the group identifier of an OS process. The OS process may be the process handling the user request, or it may be any other dedicated OS process. The OS process then calls a standard OS routine to perform an operation on the file, where the operation may be as simple as opening the file. The routine opening the file will succeed if the OS process calling the routine has the proper credentials to access the file, and the user will subsequently be granted access to the resource.

In a different embodiment using the GroupID file attribute to access the file representing the resource, making an OS call to perform an operation on the file may involve using a dedicated OS process (or a thread) that operates as part of a service or a daemon. The value of the current process GroupID attribute is stored in a temporary variable. The access identifier, which has been formatted as the GroupID file attribute, is then assigned to the process GroupID attribute. In UNIX-like operating systems, such assignment is accomplished by a system call to 'setegid'. The process then calls a standard OS routine to perform an operation on the file representing the resource. For example, the operation is opening the file. The OS routine succeeds in performing the operation if the value of the process GroupID attribute (i.e. the access identifier) matches the value of the GroupID file attribute (i.e. the access value) of the file representing the resource. If the operation on the file succeeds, the process GroupID is reset to the value stored in the temporary variable and the user is allowed to access the resource.

The approaches described herein are not limited to the specific embodiments just described. The methods may be implemented in a variety of ways including but not limited to, software applications, custom-developed APIs, library of functions, and even OS kernel modules. Moreover, the implementations may be run as standalone applications, as services, or as daemons. Different embodiments may make use of one or more OS processes, or one or more threads of a single OS process.

Furthermore, the approaches described herein are not limited to using the GroupID file attribute to gain access to the file. In one embodiment, the access value, corresponding to a unique combination of a role and a resource, is formatted as an ACL entry and is assigned to the ACL of the file representing the resource. An access identifier is created when the user requests access to the resource. The access identifier is formatted as an ACL entry, and is used as access credentials when the OS is called to perform an operation on the file representing the resource. The operation may be opening the file, or any other operation that involves comparing the access identifier to one or all of the user and group identifiers included as entries in the ACL. A different embodiment may include, in addition to comparing the access identifier to the identifiers included in the ACL, checking whether the ACL entry identified by the access identifier has associated with it permissions that allow the operation to be performed.

The approaches described herein are not limited to performing only the "open file" operation on the file representing the resource. Any file operation supported by the OS may be used. The set of operations on the file representing the resource include but is not limited to, opening the file, closing the file, reading from the file, searching through the file, writing to the file, executing the file, appending to the file, reading any file attribute, and writing or modifying any file attribute. Some embodiments may include deleting the file representing the resource.

Fine-Grained Access Control

The approaches described herein may further provide fine-grained access control to resources by using permission bits associated with the file representing the resource for access control, or by storing inside the file access control permission indicators associated with different resource operations.

Depending on the filesystem controlled by the OS, the permission bits may be represented in a variety of ways. For example, in FIG. 3A the permission bits are shown as binary digits of the "File Type/Access Permissions" file attribute in the Mode 310. In FIG. 3B, the permission bits are shown as the "r", "w", or "x" characters associated with a particular ACL entry of the ACL list 320.

The permission bits indicate whether a particular operation is performable on the file. The particular operation may include reading from the file, writing to the file, or executing the file. In the example of FIG. 3A, the types of operations are pre-ordered and known, and thus, in the "File Type/Access Permissions" file attribute, from right to left, the first three bits may indicate "execute", "write", "read" for the owner of the file, the second three bits may indicate "execute", "write", "read" for the group to which the owner of the file belongs, and the third three bits may indicate "execute", "write", "read" for any other users. In the example of FIG. 3B, the types of operations allowed for a particular user or group are indicated as "r", "w", or "x" after the name of the user or group in the ACL 320.

The permission bits of a file representing a resource, regardless of whether they are represented by binary digits or characters, may associated with permissions corresponding to resource operations performable on the resource. In one embodiment, a permission bit, associated with the file representing the resource and corresponding to a file operation, is first read. Based on the file operation indicated by the permission bit, the corresponding resource operation is determined. For example, the permission bit may be associated with a file "read" operation, and it may be associated with a resource "read" operation. If the permission bit allows the file operation to be performed on the file, then the user is granted the privilege of performing the resource operation on the resource.

Permissions bits representing read, write, and execute permissions are identified herein solely as examples, and not as limitations or requirements. For example, permissions bits may also represent permission to print, fax, sort, reset, or perform other operations with or using network resources.

Similar fine-grained access control to a resource may be achieved by storing, inside the file representing the resource, one or more permission indicators associated with different resource operations. In one embodiment, the file representing the resource is opened and a permission indicator is read from it. The permission indicator is associated with a particular resource operation, and holds a value indicating whether or not the particular resource operation is allowed on the resource. The user requesting access to the resource is enabled to perform the resource operation only if the permission indicator indicates that the user is allowed to perform the operation on the resource. In this embodiment, the file representing the resource can be formatted according to any file format allowing for storing data. Such formats include but are not limited to, fixed width, character-delimited, spreadsheet, HTML, and XML formats. Furthermore, the permission indicators may be stored within the file as a value in a predetermined position, a name-value pair, or in a tabular format. The value of the permission indicator indicating whether or not the resource operation is allowable may be a number, a character, a string of characters, or any combination of numbers, characters, or symbols.

Figure 6A:
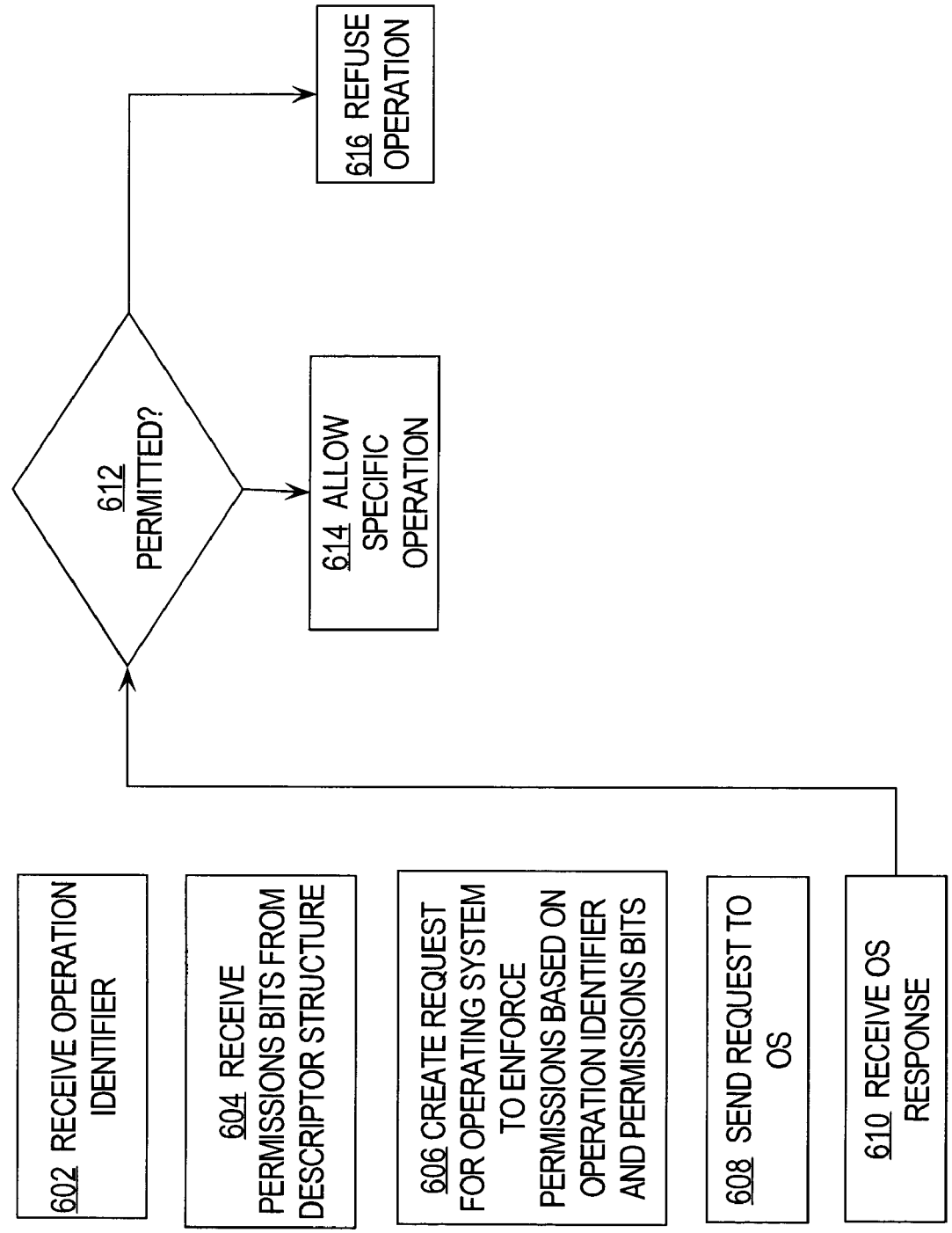
FIG. 6A is a flow diagram of a process of fine-grained access control that is enforced using an operating system.

FIG. 6A is a flow diagram of a process of fine-grained access control that is enforced using an operating system. In block 602, an operation identifier is received. The operation identifier is any information that identifies a particular operation that a user wishes to perform with a network resource. Examples of particular operations include read, write, execute, print, fax, sort, reset, or perform other operations with or using network resources. Thus, the operation identifier may represent an abstract operation other than the primitive operations that are normally supported by the filesystem of an operating system. The operation identifier may be initially received as part of the user-identifying information that is received at block 412 of FIG. 4.

In block 604, permissions bits are received from a file descriptor structure of a file that represents the network resource. For example, the process reads or otherwise receives the file type/access permissions bits 312 of inode 310 of FIG. 3A.

The permissions bits 312 may not correlate directly to the resource operation that has been specified in the operation identifier that was received in block 602. Therefore, in block 606 the process creates a request for the operating system to enforce permissions based on the operation identifier and the permissions bits. Block 606 may involve converting an abstract operation represented by the operation identifier into an operation that is understood by the operating system or represented in the permissions bits. Block 606 may also involve forming an operating system call that includes the converted value and the permissions bits.

In block 608, the request is sent to the operating system. Block 608 may involve issuing an operating system call that includes the converted value and permissions bits.

In block 610, a response is received from the operating system. Typically, the response indicates either that the requested operation is permitted or denied. In block 612, if the response indicates a permitted operation, then in block 614 the specific operation represented by the operation identifier of block 602 is permitted on the associated network resource. Conversely, if the response indicates that a refusal based on the converted value and permissions bits, then in block 616 the requested operation is refused.

Thus, in the approach for fine-grained access control provided herein, the operating system is called to use its conventional mechanism for evaluating the permissions bits of a file in comparison to a requested operation on the file, except that in the embodiments herein the permissions bits are used to represent higher-level abstract operations on network resources that are represented by the file.

Figure 6B:
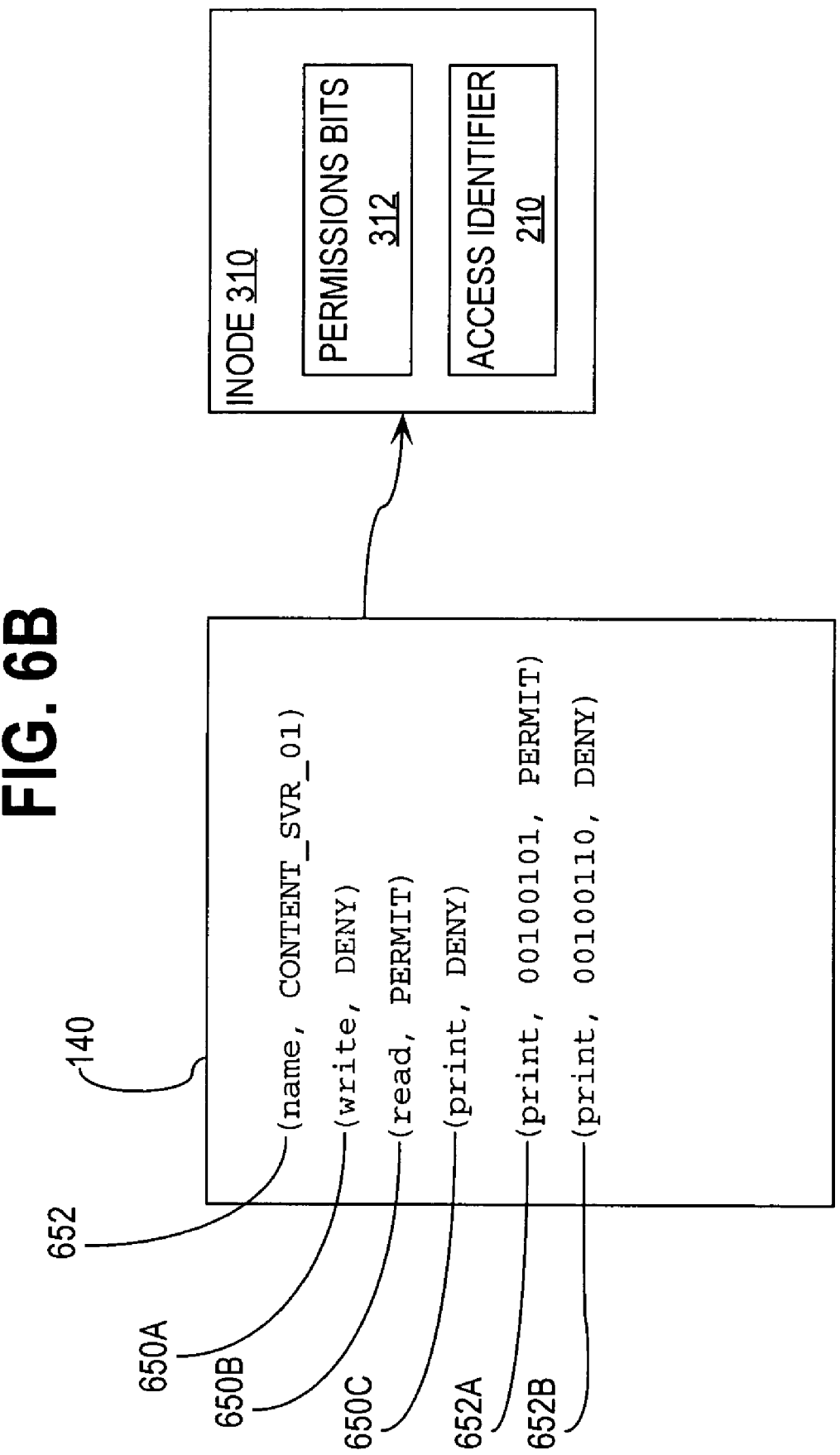
FIG. 6B illustrates a file structure that may be used to support the second approach for fine-grained access control.

FIG. 6B illustrates a file structure that may be used to support the second approach for fine-grained access control. In the example of FIG. 6B, a file 140 represents a network resource named "CONTENT_SVR_01", as indicated by a Name attribute 652. One or more permissions attributes 650A, 650B, 650C comprise name-value pairs that specify operations that could be performed on the resource represented by the file 140, and whether such operations are permitted or denied. For example, permissions attribute 650A indicates that writing to the resource represented by file 140 is denied, permissions attribute 650B indicates that reading is permitted, and permissions attribute 650C indicates that printing is denied. Attributes 650A, 650B, 650C do not reference roles, and therefore apply to all users regardless of role. There may be any number of such attributes.

Additionally or alternatively, file 140 may comprise one or more role-specific permissions attributes 652A, 652B. Each of the role-specific permissions attributes 652A, 652B comprises a 3-tuple consisting of an operation name, role identifier, and a permission indicator specifying whether the operation is permitted or denied for users in that role. The specific formats of the name, role identifier and permission indicator are not critical. In one embodiment, each role identifier may have the format of role identifier 212 of FIG. 2A.

The process of FIG. 6A may be used with a file structure of FIG. 6B, except that block 604 involves reading or otherwise receiving permissions attributes of FIG. 6B from a file representing a resource. Further, block 606 involves creating an enforcement request based on the permissions attributes.

Hardware Overview

Figure 5:
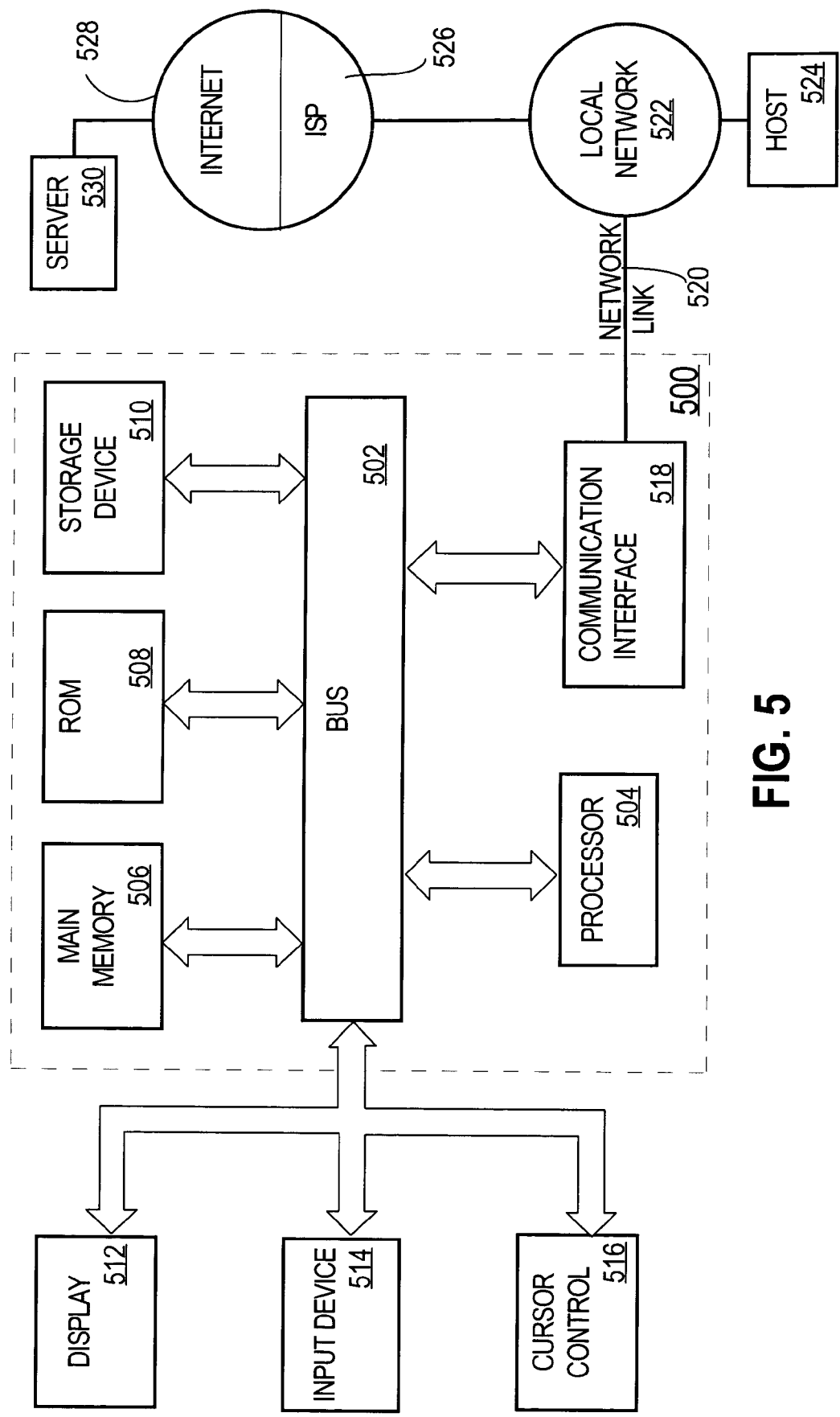
FIG. 5 is a block diagram of a computer system on which an embodiment of the invention may be implemented.

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for implementing the techniques described herein. According to one embodiment of the invention, those techniques are performed by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution. In this manner, computer system 500 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method for controlling access to a resource of a plurality of resources, the method comprising the steps of:

one or more processors creating and storing in a filesystem of an Operating System a plurality of files that each represents a different resource of the plurality of resources;

the one or more processors assigning an access value to a file attribute of a file that represents the resource, wherein the file attribute is used by the Operating System to manage file access, wherein the access value corresponds to a combination of a particular role and the resource;

the one or more processors receiving user-identifying information from a user requesting access to the resource, wherein the user-identifying information comprises a role associated with the user, wherein the role is determined from a user identifier uniquely associated with the user and from a group identifier associated with a group that includes the user;

the one or more processors receiving a resource identifier associated with the resource;

the one or more processors creating an access identifier based on the user-identifying information and the resource identifier, wherein the access identifier is formatted as a file attribute that is used by the Operating System to manage file access;

wherein the step of creating an access identifier based on the user-identifying information and the resource identifier comprises formatting the access identifier as a group identifier file attribute;

the one or more processors calling the Operating System to perform a file operation on the file, wherein calling the Operating System includes providing the access identifier to the Operating System;

wherein the step of calling the Operating System to perform an operation on the file representing the resource comprises:

assigning the access identifier to a group identifier attribute of an Operating System process; and calling an Operating System routine from the Operating System process to perform the operation on the file representing the resource;

the one or more processors granting the user access to the resource only when the Operating System call successfully performs the file operation, wherein the Operating System call successfully performs the file operation if the access identifier matches the access value;

wherein the file operation on the file representing the resource is selected from a group consisting of opening the file, closing the file, deleting the file, reading from the file, writing to the file, executing the file, appending to the file, reading a file attribute, and writing a file attribute;

reading a permission bit associated with the file representing the resource, wherein the permission bit corresponds to the operation performable on the file representing the resource;

based on the operation on the file indicated by the permission bit, determining a resource operation that is performable on the resource; and granting the user the privilege of performing the resource operation on the resource only when the permission bit allows the operation to be performed on the file representing the resource.

2. A method as recited in claim 1, wherein the access identifier comprises:

a first set of bits for storing a role identifier, wherein the role identifier is associated with the role; and a second set of bits for storing the resource identifier.

3. A method as recited in claim 1, wherein the step of calling the Operating System to perform an operation on the file representing the resource comprises comparing the access identifier to an identifier included in an Access Control List file attribute associated with the file representing the resource, wherein the Access Control List file attribute includes the identifiers of all users and all groups of users allowed to access the file representing the resource.

4. A method as recited in claim 1, the method further comprising the steps of:

opening the file representing the resource;

reading from the file representing the resource a permission indicator associated with a resource operation; and enabling the user to perform the resource operation on the resource only when the permission indicator indicates that the user is allowed to perform the resource operation on the resource.

5. A method as recited in claim 1, wherein the file attribute used by the Operating System to manage file access is a group identifier file attribute.

6. A computer-implemented method for controlling access to a resource of a plurality of resources, the method comprising the steps of:

one or more processors assigning an access value to a group identifier file attribute of a file that represents the resource, wherein the group identifier file attribute is used by the Operating System to manage file access, wherein the access value is uniquely determined by a combination of a particular role and the resource;

the one or more processors receiving a user identifier from a user requesting access to the resource, wherein the user identifier is uniquely associated with the user;

the one or more processors receiving a group identifier associated with a group to which the user belongs;

the one or more processors based on the user identifier and the group identifier, determining a role associated with the user, wherein a role identifier is uniquely associated with the role;

the one or more processors receiving a resource identifier associated with the resource, wherein each resource of the plurality of resources is represented by a different file stored in a filesystem of an Operating System;

the one or more processors constructing an access identifier on the basis of the role identifier and the resource identifier, wherein the access identifier conforms to the format of a group identifier file attribute that is used by the Operating System to manage file access;

the one or more processors making an Operating System call to perform a file operation on the file representing the resource, wherein the Operating System call uses the access identifier to gain access to the file representing the resource; and the one or more processors granting the user access to the resource only when the Operating System call successfully performs the file operation on the file representing the resource, wherein the Operating System call successfully performs the file operation if the access identifier matches the access value;

wherein the file operation on the file representing the resource is selected from a group consisting of opening the file, closing the file, deleting the file, reading from the file, writing to the file, executing the file, appending to the file, reading a file attribute, and writing a file attribute;

reading a permission bit associated with the file representing the resource, wherein the permission bit corresponds to a file operation performable on the file representing the resource;

based on the file operation indicated by the permission bit, determining a resource operation that is performable on the resource; and granting the user the privilege of performing the resource operation on the resource only when the permission bit allows the file operation to be performed on the file representing the resource.

7. A method as recited in claim 6, wherein the access identifier comprises:

a first set of bits for storing the role identifier, wherein the role identifier represents a bitmap, each bit of the bitmap uniquely associated with a role of the user; and a second set of bits for storing the resource identifier.

8. A method as recited in claim 6, wherein the step of making an Operating System call to perform an operation on the file representing the resource comprises:

storing the group identifier value of a group identifier attribute of an Operating System process;

assigning the access identifier to the group identifier attribute of the Operating System process;

calling an Operating System routine from the Operating System process to perform the operation on the file representing the resource, wherein the operation on the file representing the resource is performed only when the value of the group identifier attribute of the Operating System process matches the value of the group identifier file attribute of the file representing the resource; and resetting the group identifier attribute of the Operating System process to the stored group identifier value.

9. A method as recited in claim 6, wherein the step of making an Operating System call to perform an operation on the file representing the resource comprises comparing the access identifier to an identifier included in an Access Control List file attribute associated with the file representing the resource, wherein the Access Control List file attribute includes the identifiers of all users and all groups of users allowed to access the file representing the resource.

10. A method as recited in claim 6, the method further comprising the steps of:

opening the file representing the resource;

reading from the file representing the resource a permission indicator associated with a resource operation; and granting the user the privilege of performing the resource operation on the resource only when the permission indicator indicates that the user is allowed to perform the resource operation on the resource.

11. A system for controlling access to a resource, of a plurality of resources, connected to a network, the system comprising:

a client host capable of accessing the resource in response to a request for access from a user;

one or more processors executing an Operating System, wherein the Operating System operatively controls a filesystem that includes a number of files; and a computer readable medium having stored therein an Application Programming Interface, wherein the Application Programming Interface is logically interposed between the client host and the Operating System and comprises one or more routines including routines which, when executed by the one or more processors, cause the one or more processors to perform the steps of:

creating and storing in the filesystem a plurality of files that each represents a different resource of the plurality of resources;

assigning an access value to a file attribute of a file that represents the resource, wherein the file attribute is used by the Operating System to manage file access, wherein the access value corresponds to a combination of a particular role and the resource;

receiving user-identifying information from the user requesting access to the resource, wherein the user-identifying information comprises a role associated with the user, wherein the role is determined from a user identifier uniquely associated with the user and from a group identifier associated with a group that includes the user;

receiving a resource identifier associated with the resource;

creating an access identifier based on the user-identifying information and the resource identifier, wherein the access identifier is formatted as a file attribute that is used by the Operating System to manage file access;

wherein the step of creating an access identifier based on the user-identifying information and the resource identifier comprises formatting the access identifier as a group identifier file attribute;

calling the Operating System to perform a file operation on the file, wherein calling the Operating System includes providing the access identifier to the Operating System;

the step of calling the Operating System to perform an operation on the file representing the resource comprises:

assigning the access identifier to a group identifier attribute of an Operating System process, and calling an Operating System routine from the Operating System process to perform the operation on the file representing the resource;

granting the user access to the resource only when the Operating System call successfully performs the file operation, wherein the Operating System call successfully performs the file operation if the access identifier matches the access value;

wherein the file operation on the file representing the resource is selected from a group consisting of opening the file, closing the file, deleting the file, reading from the file, writing to the file, executing the file, appending to the file, reading a file attribute, and writing a file attribute;

reading a permission bit associated with the file representing the resource, wherein the permission bit corresponds to a file operation performable on the file representing the resource;

based on the file operation indicated by the permission bit, determining a resource operation that is performable on the resource; and granting the user the privilege of performing the resource operation on the resource only when the permission bit allows the file operation to be performed on the file representing the resource.

12. A system as recited in claim 11, wherein the access identifier comprises:

a first set of bits for storing a role identifier, wherein the role identifier is associated with the role; and a second set of bits for storing the resource identifier.

13. A computer-readable storage medium, for controlling access to a resource of a plurality of resources, carrying one or more sequences of instructions which, when executed by one or more processors, causes the one or more processors to perform the steps of:

creating and storing in a filesystem of an Operating System a plurality of files that each represents a different resource of the plurality of resources;

assigning an access value to a file attribute of a file that represents the resource, wherein the file attribute is used by the Operating System to manage file access, wherein the access value corresponds to a combination of a particular role and the resource;

receiving user-identifying information from a user requesting access to the resource, wherein the user-identifying information comprises a role associated with the user, wherein the role is determined from a user identifier uniquely associated with the user and from a group identifier associated with a group that includes the user;

receiving a resource identifier associated with the resource;

creating an access identifier based on the user-identifying information and the resource identifier, wherein the access identifier is formatted as a file attribute that is used by the Operating System to manage file access;

wherein the step of creating an access identifier based on the user-identifying information and the resource identifier comprises formatting the access identifier as a group identifier file attribute;

calling the Operating System to perform a file operation on the file, wherein calling the Operating System includes providing the access identifier to the Operating System; and wherein the step of calling the Operating System to perform an operation on the file representing the resource comprises:
  assigning the access identifier to a group identifier attribute of an Operating System process, and
  calling an Operating System routine from the Operating System process to perform the operation on the file representing the resource;

granting the user access to the resource only when the Operating System call successfully performs the file operation, wherein the Operating System call successfully performs the file operation if the access identifier matches the access value;

wherein the file operation on the file representing the resource is selected from a group consisting of opening the file, closing the file, deleting the file, reading from the file, writing to the file, executing the file, appending to the file, reading a file attribute, and writing a file attribute;

reading a permission bit associated with the file representing the resource, wherein the permission bit corresponds to a file operation performable on the file representing the resource;

based on the file operation indicated by the permission bit, determining a resource operation that is performable on the resource; and granting the user the privilege of performing the resource operation on the resource only when the permission bit allows the file operation to be performed on the file representing the resource.

14. A computer-readable storage medium as recited in claim 13, wherein the access identifier comprises:
  a first set of bits for storing a role identifier, wherein the role identifier is associated with the role; and
  a second set of bits for storing the resource identifier.

15. A computer-readable storage medium as recited in claim 13, wherein the step of calling the Operating System to perform an operation on the file representing the resource comprises comparing the access identifier to an identifier included in an Access Control List file attribute associated with the file representing the resource, wherein the Access Control List file attribute includes the identifiers of all users and all groups of users allowed to access the file representing the resource.

16. A computer-readable storage medium as recited in claim 13, carrying one or more additional sequences of instructions which, when executed by one or more processors, further causes the one or more processors to perform the steps of:
  opening the file representing the resource;
  reading from the file representing the resource a permission indicator associated with a resource operation; and
  enabling the user to perform the resource operation on the resource only when the permission indicator indicates that the user is allowed to perform the resource operation on the resource.

17. A computer-readable storage medium as recited in claim 13, wherein the file attribute used by the Operating System to manage file access is a group identifier file attribute.

18. A computer-readable storage medium, for controlling access to a resource of a plurality of resources, carrying one or more sequences of instructions which, when executed by one or more processors, causes the one or more processors to perform the steps of:
  assigning an access value to a group identifier file attribute of a file that represents the resource, wherein the group identifier file attribute is used by the Operating System to manage file access, wherein the access value is uniquely determined by a combination of a particular role and the resource;
  receiving a user identifier from a user requesting access to the resource, wherein the user identifier is uniquely associated with the user;
  receiving a group identifier associated with a group to which the user belongs;
  based on the user identifier and the group identifier, determining a role associated with the user, wherein a role identifier is uniquely associated with the role;
  receiving a resource identifier associated with the resource, wherein each resource of the plurality of resources is represented by a different file stored in a filesystem of an Operating System;
  constructing an access identifier on the basis of the role identifier and the resource identifier, wherein the access identifier conforms to the format of a group identifier file attribute that is used by the Operating System to manage file access;
  making an Operating System call to perform a file operation on the file representing the resource, wherein the Operating System call uses the access identifier to gain access to the file representing the resource; and
  granting the user access to the resource only when the Operating System call successfully performs the file operation on the file representing the resource, wherein the Operating System call successfully performs the file operation if the access identifier matches the access value;
  wherein the file operation on the file representing the resource is selected from a group consisting of opening the file, closing the file, deleting the file, reading from the file, writing to the file, executing the file, appending to the file, reading a file attribute, and writing a file attribute;
  reading a permission bit associated with the file representing the resource, wherein the permission bit corresponds to a file operation performable on the file representing the resource;
  based on the file operation indicated by the permission bit, determining a resource operation that is performable on the resource; and
  granting the user the privilege of performing the resource operation on the resource only when the permission bit allows the file operation to be performed on the file representing the resource.

19. A computer-readable storage medium as recited in claim 18, wherein the access identifier comprises:
  a first set of bits for storing the role identifier, wherein the role identifier represents a bitmap, each bit of the bitmap uniquely associated with a role of the user; and
  a second set of bits for storing the resource identifier.

20. A computer-readable storage medium as recited in claim 18, wherein the step of making an Operating System call to perform an operation on the file representing the resource comprises:

storing the group identifier value of a group identifier attribute of an Operating System process;

assigning the access identifier to the group identifier attribute of the Operating System process;

calling an Operating System routine from the Operating System process to perform the operation on the file representing the resource, wherein the operation on the file representing the resource is performed only when the value of the group identifier attribute of the Operating System process matches the value of the group identifier file attribute of the file representing the resource; and resetting the group identifier attribute of the Operating System process to the stored group identifier value.

21. A computer-readable storage medium as recited in claim 18, wherein the step of making an Operating System call to perform an operation on the file representing the resource comprises comparing the access identifier to an identifier included in an Access Control List file attribute associated with the file representing the resource, wherein the Access Control List file attribute includes the identifiers of all users and all groups of users allowed to access the file representing the resource.

22. A computer-readable storage medium as recited in claim 18, carrying one or more additional sequences of instructions which, when executed by one or more processors, further causes the one or more processors to perform the steps of:

opening the file representing the resource;

reading from the file representing the resource a permission indicator associated with a resource operation; and granting the user the privilege of performing the resource operation on the resource only when the permission indicator indicates that the user is allowed to perform the resource operation on the resource.

23. An apparatus for controlling access to a resource of a plurality of resources, comprising:

means for creating and storing in an Operating System filesystem a plurality of files that each represents a different resource of the plurality of resources;

means for assigning an access value to a file attribute of a file that represents the resource, wherein the file attribute is used by the Operating System to manage file access, wherein the access value corresponds to a combination of a particular role and the resource;

means for receiving user-identifying information from a user requesting access to the resource, wherein the user-identifying information comprises a role associated with the user, wherein the role is determined from a user identifier uniquely associated with the user and from a group identifier associated with a group that includes the user;

means for receiving a resource identifier associated with the resource;

means for creating an access identifier based on the user-identifying information and the resource identifier, wherein the access identifier is formatted as a file attribute that is used by the Operating System to manage file access;

wherein means for creating an access identifier based on the user-identifying information and the resource identifier comprises means for formatting the access identifier as a group identifier file attribute;

means for calling the Operating System to perform a file operation on the file, wherein calling the Operating System includes providing the access identifier to the Operating System;

wherein means for calling the Operating System to perform an operation on the file representing the resource comprises:

means for assigning the access identifier to a group identifier attribute of an Operating System process, and means for calling an Operating System routine from the Operating System process to perform the operation on the file representing the resource;

means for granting the user access to the resource only when the Operating System call successfully performs the file operation, wherein the Operating System call successfully performs the file operation if the access identifier matches the access value;

wherein the file operation on the file representing the resource is selected from a group consisting of opening the file, closing the file, deleting the file, reading from the file, writing to the file, executing the file, appending to the file, reading a file attribute, and writing a file attribute;

means for reading a permission bit associated with the file representing the resource, wherein the permission bit corresponds to a file operation performable on the file representing the resource;

means for determining, based on the file operation indicated by the permission bit, a resource operation that is performable on the resource; and means for granting the user the privilege of performing the resource operation on the resource only when the permission bit allows the file operation to be performed on the file representing the resource.

24. An apparatus as recited in claim 23, wherein the access identifier comprises:

a first set of bits for storing a role identifier, wherein the role identifier is associated with the role; and a second set of bits for storing the resource identifier.

\* \* \* \* \*